Jan. 12, 1971  F. C. ARMISTEAD  3,553,968
STABILIZED OFFSHORE PLATFORM
Filed Dec. 19, 1968  2 Sheets-Sheet 1
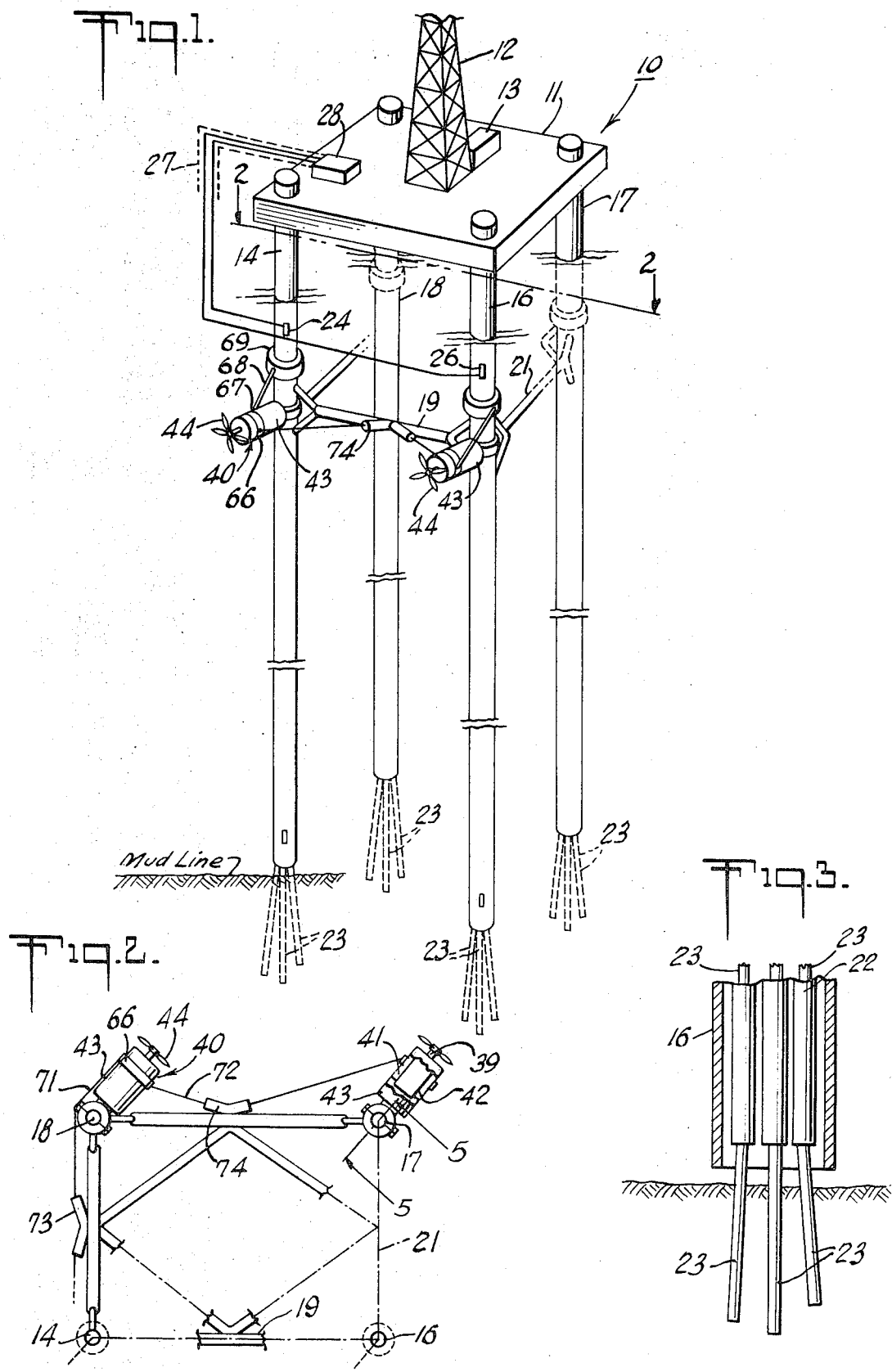

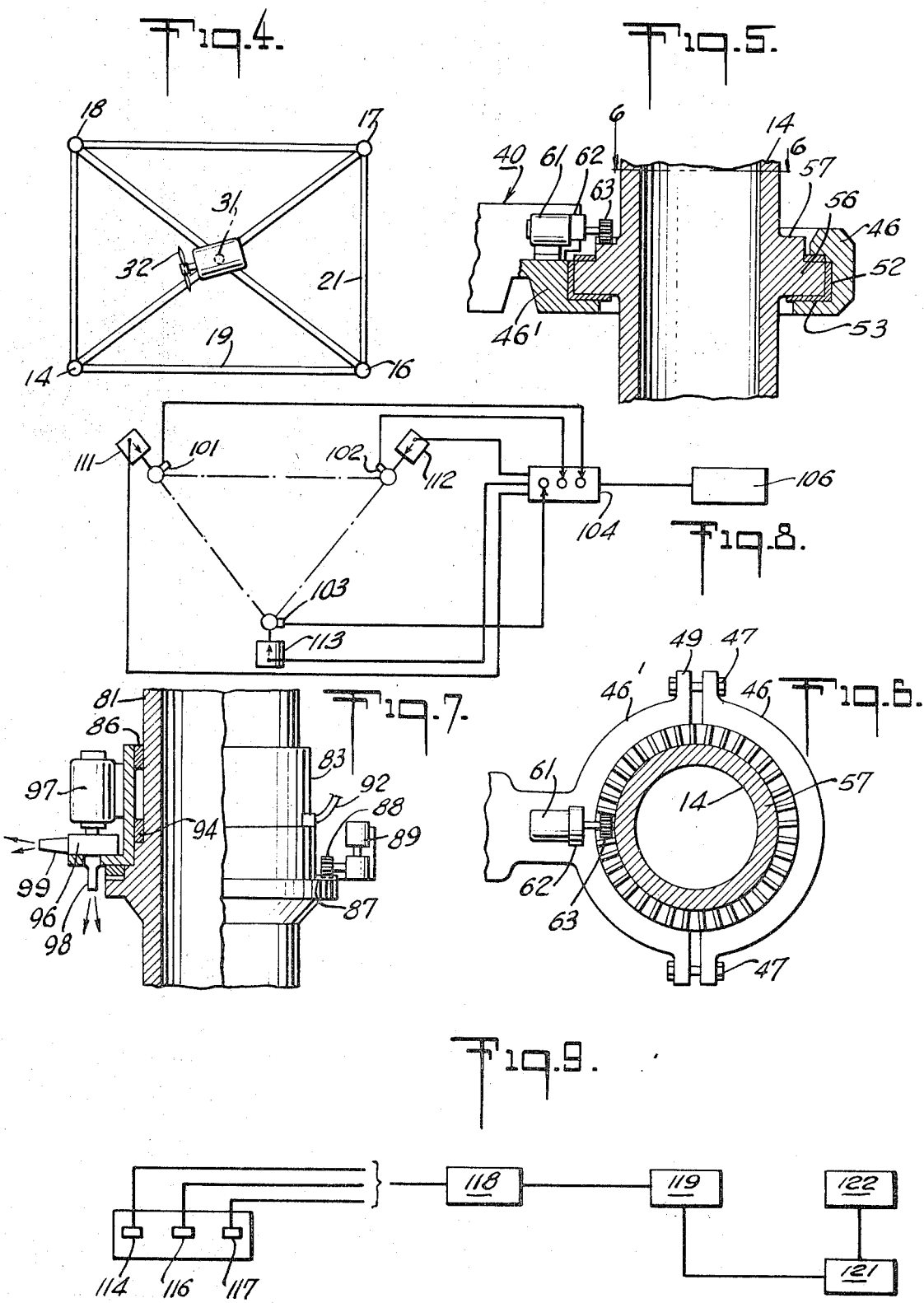

United States Patent Office 3,553,968
Patented Jan. 12, 1971

1

3,553,968
STABILIZED OFFSHORE PLATFORM
Fontaine C. Armistead, Darien, Conn., assignor to Texaco Development Corporation, New York, N.Y., a corporation of Delaware
Filed Dec. 19, 1968, Ser. No. 785,131
Int. Cl. E02b 17/00
U.S. Cl. 61—46.5
18 Claims

ABSTRACT OF THE DISCLOSURE

The invention relates to a dynamically stabilized, offshore platform supported by an elongated rigid structure having the lower end fastened into the floor of a body of water. The structure includes a signal generating monitor system adapted for continuously monitoring the degree and frequency of the structure's lateral displacement. The displacement is automatically counteracted by an under water reactive force periodically applied to the structure in a direction opposite to the displacing force, and at a magnitude and frequency in accordance with the generated signal whereby to avoid the creation of a harmful resonant vibration in the structure due to constant wave action.

BACKGROUND OF THE INVENTION

To be both practical and useful, offshore platforms used for the exploration and production of crude oil and gas sources, must not only perform a desired function but do so under adverse operating conditions. Primary among such conditions are situations prompted by the weather. More particularly a virtually unpredictable source of trouble at any offshore platform is the continuously changing pattern of wave intensity which reflects widespread weather conditions. For example, a weather situation at one part of the world can have a decided effect on water and wave conditions in a remote sector thousands of miles away.

In the design and construction of offshore platforms, most weather conditions can be accounted for through the expediency of fabricating the platform of sufficent strength to satisfactorily support the required constant and expected load, and to overcome and to resist the most adverse storm conditions. Thus, a platform might be engineered to be sufficiently rugged by sheer massiveness, to resist hurricane forces at the water's surface without collapse or even to avoid excessive damage. On the other hand at virtually any given locality, due to the nature of worldwide weather conditions an offshore platform will be subjected to a continuous although intermittent force instituted by prevailing water and wave conditions.

For example, it is known that most ordinary ocean wave movement occurs in response to either wind or other natural phenomena. The period of deep ocean surface waves depends on the origin of the wave making disturbance as well as on the nature of the restoring force. The wave period is known to lie within the range of 0.1 seconds to 24 hours and greater. As to constituting a peril to an offshore platform of the type contemplated. it is found that the ordinary gravity wave as well as the infra-gravity wave tend to be most dangerous. The respective periods of these two types of waves is within the range of about 1 second to 5 minutes. Under the constant action of such waves, the periodic lateral force exerted against the platform could, over a period of time, set up a sway tempo in the platform that approaches the natural frequency of the latter. In such an instance the platform will be caused to sway excessively thereby prompting the possibility of being destroyed.

As mentioned, the platform itself is usually designed to safely resist maximum forces as would be instituted by a hurricane or severe storm. What is more difficult to overcome however is the problem instituted by the pulsating forces resulting from periodic wave movement. While such movement may not be particularly intense, the periodic forces generated by the waves may be of such frequency that if continued over a period of time will prompt, and amplify an oscillatory movement in the floor anchored platform structure. This vibrational tendency will be a function of the platform's structure, and the intensity and frequency of the wave forces.

It is possible through engineering techniques to adequately design a platform to overcome the normal and expected wave forces. On the other hand, to consider the problem of oscillatory vibrations, or platform sway tempo, including reaching the ultimate harmonic vibrational characteristics of the platform, can be difficult and lead to platform designs of a highly impractical nature both structurally and economically. It can be readily appreciated that for platforms usable in deep waters, the design problems are sharply aggravated as the platform height increases. For extreme depths having an order of magnitude of 400 to 1,000 feet, it is virtually impossible to design and engineer a safe, practical platform.

Toward overcoming the constantly imposed vibration or oscillation inducing forces, as well as the ordinary natural forces acting against an offshore structure, many expedients have been resorted to such as internal bracing and external anchoring. In the instance of the latter, structures in relatively deep waters often utilize an anchoring system including chains and cables, both of which elements present a troublesome handling problem, and are not entirely effective. Furthermore since the present trend in oil exploratory and productions efforts is toward deeper waters, the anchoring systems tend to become more expansive and unwieldy, thereby amplifying the above noted susceptibility to sway and vibrational tendencies.

It is therefore one of the objects of the invention to provide a relatively rigid yet vibrationally stabilized offshore platform. A further object is to provide a platform adapted to dynamically overcome any tendency toward assuming a periodic oscillation which would over a period of time detrimentally affect the platform. A still further object is to provide an offshore platform of the type contemplated which is firmly anchored to the floor of a desired offshore location and yet dynamically stabilized to maintain its anchored position while overcoming vibrational tendencies. Still another object is to provide a stabilizing system for an offshore platform adapted to continuously monitor and counteract detrimental displacement due to wind and wave action. Another object is to provide a system for continuously and dynamically balancing a rigidly anchored offshore structure. And, a further object is to provide a system for applying a continuous although dynamically varying reactive force against an offshore platform to stabilize the position of the platform against wind and wave action.

BRIEF DESCRIPTION OF THE DRAWINGS

In the drawings FIG. 1 illustrates an offshore platform of the type contemplated located in a relatively deep body of water and supported by rigidly fixed upright legs. FIG. 2 is a cross-sectional view taken along line 2—2 in FIG. 1. FIG. 3 is a segmentary view on an enlarged scale and in partial cross-section, of the lower end of a platform leg. FIG. 4 is a view similar to that in FIG. 2 illustrating an alternate embodiment of the invention utilizing a single thrust unit. FIG. 5 is a segmentary, enlarged sectional view taken along line 5—5 of FIG. 2. FIG. 6 is a view in cross-section taken along line 6—6 in FIG. 5. FIG. 7 is a segmentary view in partial cross-section illustrating an alternate embodiment of the invention. FIG. 8 is a schematic representation of the stabilizing system disclosed, and FIG. 9, similar to FIG. 8 is a schematic representation of the inventive system.

In achieving the foregoing objectives, and toward overcoming the discussed problems, the present invention contemplates an offshore platform comprising in essence a working deck, holding equipment and the like for conducting an offshore operation beneath the surface of the body of water. The deck is maintained at a desired location and elevation above the water's surface by an elongated support structure comprising an open framework of structural members. The lower end of the structure is disposed adjacent to the floor of the body of water and is there anchored by means such as piles or the like depending from the structure's lower end and imbedded into the floor. Since the structure basically comprises an upright, end fastened member disposed in a fluid, the structure will be subjected to lateral forces instituted by wind and wave action. Over a period of time these forces tend to establish a moment about the anchoring point and, under certain conditions, can induce an increasingly amplified oscillatory movement in the platform.

A stabilizing system incorporated into the structure includes a monitoring apparatus adapted to continuously scan, evaluate and interpret lateral movement of the structure upper end, and to establish an output signal reflecting the nature of the displacement and its frequency. A force countering system incorporated into the structure comprises means for instituting an under water counteracting force toward offsetting the displacement. Control means connected to the platform is adapted to regulate the counter force in response to the character of the signal generated by the monitor system.

Referring to FIG. 1, an offshore structure of the type presently contemplated includes a platform 10 comprising a deck 11 holding such equipment as a derrick 12, drawworks 13, storage facilities, and other equipment essential to the proper functioning of an offshore drilling or producing platform. Deck 11 is shown elevated a predetermined distance of about 50 to 100 feet above the surface of the water. Thus, while the working deck and equipment are essentially beyond the reach of the water and waves, still they are subjected to the full effect of the surface weather conditions.

Deck 11 is sustained in its elevated position above the water's surface by an elongated open structure comprising essentially a plurality of downward extending legs 14, 16, 17 and 18 which may be fixedly or movably attached at their upper ends to the deck 11.

In the instance of a vertically adjustable deck, the respective leg connections of the jack-up type whereby deck 11 might be raised or lowered in accordance with the depth of water and weather conditions. The upstanding legs are reinforced longitudinally by cross-bracing members such as tubular element 19 which form an open framework extending from the lower end of the structure to a point adjacent the upper end. The bracing arrangement as presently shown is of course exemplary of the type which might be employed on the deck and the expected loading conditions.

Referring to FIG. 3, the framework structure further includes a plurality of pile guides 22 which might be separate members, or which as shown in FIG. 3, are conveniently incorporated into the respective supporting legs. Each pile guide 22 comprises an elongated tubing length of sufficient diameter to slidably accommodate a pile 23, and which is subsequently fastened within the guide 22 by a cemented collar or other rigid connection. The lower ends of the respective piles extend from the guide 22 lower end and are imbedded into the ocean substratum. According to practice, the depth of pile imbedment is readily predetermined in accordance with the consistency of the substratum and the ability of the latter to grip the pile whereby to establish a firm anchor for the structure lower end.

As previously noted, the upright arrangement of the platform is such that the action of the wind and the waves against exposed, elevated deck 11 as well as against the submerged support structure, tends to urge the bottom anchored platform laterally from its normal upright disposition much in the manner of any end fastened member. The degree of such bending displacement will vary with the intensity of the displacing force and tend to sway or upset the structure about its anchored footings.

During the drilling phase of forming a producing well, it is desirable, although not necessary that deck 11 be maintained in substantially vertical alignment with the bottom positioned well head to avoid excessive strain on the drill string. However, while the actual horizontal displacement of the deck can be accommodated by the flexibility of the drill tubing extending between the deck and the well head, of further concern is the propensity of the structure to oscillated. If the natural frequency of such oscillation approaches or is close to the frequency or period of the ocean waves for any length of time, a resonant condition may be set up in the platform structure. This phenomena is analogous to the situation when a group of men are marched in step across a bridge or span. To avoid the marching templo achieving the bridge's resonant frequency, the men break step.

The monitor system or apparatus incorporated into the platform structure is provided to continuously scan, monitor and interpret the above noted platform lateral displacement and the frequency of displacement. The monitor system thereafter determines the rate of the platform's sway tempo, and generates a signal to reflect the interpretation of the received data. The monitor system may include any of several means adeqaute to achieve the desired function. For example the structure may be provided with appropriately placed strain gauges such as 24 and 26 which, if properly positioned, will reflect the degree of strain at any particular point in the structure as the latter is displaced from its normal position. Such strain gauges adapted for providing the necessary data might be carried on the elongated legs 14, 16, 17 and 18 as shown, or positioned on bracing member 19. Preferably the measuring devices are disposed at critical points throughout the entire structure to obtain a more composite set of data with respect to displacement of the structure.

Any number and types of commercial strain gauges might be utilized for educing the necessary continuous measurement data. The following description however will assume a gauge of a type that rigidly attaches to one or more structural members, and will distort in an amount proportional to the degree of strain imposed on a particular member or joint. Such distortion is then converted and amplified into a readable mechanical or electrical signal. In the instant situation, the data obtained from a plurality of gauges is assimilated into a comprehensive reading or program for application to the force imposing mechanism.

As shown, each support leg 14, 16, 17 and 18 is provided with at elast one gauge as 24 and 26 connected to the respective legs at points that will be subjected to a characteristic bending stress. Each gauge includes water tight conduit means 27, shown schematically, that carries electrical cable from the gauge to a surface located data assimilator or computer 28.

Stabilizing system

The stabilizing system incorporated into the platform structure, and regulated by the monitor system, includes in essence a variable source of mechanical or hydraulic power. The thrusting force generated by the power source may be embodied in the form of a drive propeller, high pressure water, jets, or the like. The thrusting or reacting forces are not only vairable in magnitude, but directionally adjustable by alignment of the respective thrust elements to best achieve an appregate reactant. It can be appreciated that the reacting force may be embodied in a single reactant unit as well as in a plurality of separate units.

One embodiment of the stabilizer system is shown in FIGS. 1, 2, 5, 6 and 7, and includes a plurality of thruster units 40 disposed in a generally horizontal position and connected to upright leg 14. Each such thruster unit is substantially identical in structures and capability to similar units on the other legs; consequently the description of the present unit will suffice for all.

The respective thrusters may be fixedly fastened to the respective platform legs and retain their capability for providing a suitable reactive force. The feature of mobility of the respective units, as presently shown and described, affords a greater degree of efficiency as well as versatility.

Each thruster 40 includes an internal frame or chassis 41 which supports a power source 42 such as an automatically controllable electric motor or internal combustion engine. The internal framework is enclosed by a housing 43 which preferably, although not essentially forms a water tight enclosure about the power unit. Housing 43 is provided at the forward end with a propeller 44 connected by an elongated journalled shaft 39 to drive motor 42.

Referring to FIGS. 5 and 6, toward achieving maximum versatility of the stabilizing system, each unit 40 is pivotally movable about a leg of the platform. As shown, each power unit 40 is provided with a split ring clamp 46–46' which, when connected by the fasteners 47 at opposed side flanges 49, forms a rigid, annular collar about leg 14.

The latter is provided on the external surface with a raised peripheral track 56 having a circular segment 57 in the form of a ring gear. Track 56 functions as a guide and bearing surface for clamp ring 46–46' and is provided with one or more shoe plates 52 and 53 on the outer bearing surfaces.

In the assembled position, a motor 61, together with a speed reducing transmission 62, is carried in the housing 43. A pinion gear 63 sealably journalled to the housing wall is in meshed engagement with ring gear 57. Thus, to pivotally rotate unit 40 in a horizontal plane about leg 14, requires only actuation of the drive motor 61 in response to a given signal.

Referring to FIGS. 1 and 2, housing 43 is provided with a peripheral ring 66 having a connection 67 at the upper end fastened to a support cable 68 which in turn is attached to a collar 69 carried on leg 14 to provide vertical support to the overhung thruster unit 40. The upper ring 69 may be rotatably held on leg 14 as the unit 40 is rotated into a desired position, or a similar means may be incorporated into the structure permitting such relative rotative movement.

As shown in FIG. 1, the structure of the supporting tubular element 19 connecting the respective legs 14 and 16, includes a bifurcated end section connected to leg 14 whereby housing 43 might be rotated through an arc approximately 270° for positioning in opposition to a wave force exerted against the platform.

Housing ring 66 is further provided with two or more lateral connections to which respective tensioning cables 71 and 72 are attached. The function of these members is to maintain a substantially constant lateral tension on thrust unit 40 at all times. Each tensioning cable further includes a motor and reel assembly 73 and 74 supported on the framework structure to apply a continuous balancing force to thrusters 40 for rigidly positioning the same.

In the present arrangement, the aggregate reactant force, countering a wave displacing force, may be effected through a plurality of discretely directed thruster positioned units as described. Alternately, and referring to FIG. 4, a reactant force may similarly be directed through a single pivotally mounted power system 31 including a propeller bank 32 disposed centrally of, and near the support structure upper end. Further, although the foregoing description has disclosed thrust elements 40 as comprising an electric motor driven propeller, the reactant power source is not so limited. An alternate arrangement utilizes sea water as the moving element in a motor driven centrifugal pump unit.

Referring to FIGS. 1 and 7, the latter illustrates a centrifugal pump operably carried on an upstanding leg of the platform of the type shown in FIG. 1. Again referring to FIG. 7, elongated platform leg 81 is disposed in a generally upright position and supportably connected at the upper end to a platform, with the lower end adjacent the ocean floor.

Referring to FIG. 7 a circular ring-like track 82 is carried on the leg 81 outer surface at a point beneath the water surface. Leg 81 also includes bearing collars 86 and 94 spaced upwardly of said track 82. The upper surface of the track 82 is provided with a ring gear 87 adapted to mesh with a pinion gear 88 carried on drive motor 89 which is in turn mounted to carriage 83.

Drive motor 89 is adapted to rotate carriage 83 about leg 81 to a predetermined position. Circular rings 86 and 94 are disposed about the leg 81, and spaced upwardly from track 82 to afford a bearing surface between the platform leg and the inner surface of carriage 83. A motor-driven centrifugal pump unit carried on the carriage includes pump 96 connected to the shaft of motor 97. The pump unit is disposed at a generally upright disposition on carriage 83, having the pump suction 98 immersed in water, and the discharge 99 directed horizontally outward.

In accordance with the degree and frequency, as well as the direction of displacing waves against the platform, drive motor 89 will be actuated to rotatably adjust carriage 83 into a predetermined vector around the leg whereby to align discharge nozzle 99 in a proper direction for achieving maximum hydraulic thrust.

Driver pump 96 and carriage 83 as shown, might be carried on each leg of the platform in a manner to permit adjustment of the individual thrust units whereby to directionally concentrate the reactant force created by the plurality of thrust pumps. While the present arrangement discloses a plurality of thrust applying pumps for establishing a controllable reactant force, it is appreciated that a similar result is obtainable through use of a single, large capacity and centrally located pump unit.

The foregoing has described several embodiments of an apparatus adapted to controllably regulate and minimize undesirable platform sway. The specific arrangements disclosed of one or more thrust units with respect to the platform framework together with the placement and number of gauges to measure platform displacement, will determine the accuracy and efficiency of any stabilizing system for a particular platform. It is appreciated that for less severe wave and weather conditions, a single, either fixedly or dynamically positioned thruster, together with a minimum number of gauges could achieve the desired stabilizing effect. However in an offshore location subjected to severe wind and wave action from any quarter, the stabilizing system would be more complicated and beneficially comprise a plurality of thrusters preferably adjustable to achieve maximum utility and versatility.

Further, the particular arrangement of thrusters and displacement measuring gauges disposed about the platform is also a function of the prevalent operating conditions. As an example, FIG. 8 illustrates schematically the arrangement of a stabilizing system utilizing three strain gauges 101, 102 and 103 as provided on a three legged offshore platform. The gauges are electrically connected to a controller 104 consisting of a device, many of which are on the commercial market, for assimilating the electrical data received from the respective gauges and converting such data into a readable signal. Controller 104 is in turn powered by an electric source such as a generator 106. A plurality of input signals fed from the respective gauges to controller 104 are evaluated, converted into a composite output signal, and programmed into the respective thrusters 111, 112 and 113 to achieve a particular counter force best able to overcome the platform displacement. The controlled program from 104 of course regulates application of the reacting force by way of the thrusters as to magnitude and timing. Further, the programming provides a sufficiently large reactive force of such a time to avoid over-reacting against the displacing wave forces.

In a further schematic embodiment of the stabilizing system as shown in FIG. 9, data from the respective strain gauges 114, 116 and 117 is evaluated in assimilator 118, and fed to a computer 119 capable of programming such information as to predict in advance the sequence and frequency of the periodically occurring wave forces. A computer applicable to the present function is a commercially available item, requiring only adaptation to the reception of the signals furnished by the respective strain measuring devices. This information thus compiled is utilized to regulate generator unit 121 which in turn actuates the thruster 122 to provide the necessary counter force against the adverse wave action.

Other modifications and variations of the invention as hereinbefore set forth may be made without departing from the spirit and scope thereof, and only such limitations should be imposed as are indicated in the appended claims.

I claim:

1. In combination with an elongated platform structure anchored at an offshore location in a body of water, said structure being normally subject at said location to oscillatory swaying movement about the anchor and lower end as a result of the lateral displacement of the structure under the influence of periodically occurring wave forces, said structure including an equipment holding deck, a rigid framework having the upper end supportably connected to said equipment holding deck and the lower end fixedly imbedded in the floor of said body of water;
   (a) a dynamic stabilizing system integral with said structure and being periodically actuable to provide a reactive force of sufficient magnitude and direction to counteract said wave forces imposed against said structure, said stabilizing system comprising,
   (b) monitor means coperative with said structure and operable to constantly determine the degree of said platform lateral displacement and the frequency of occurrence thereof,
   (c) at least one stabilizer unit connected to said platform and being operable to provide said reactive force, and
   (d) control means integral with said monitor means and connected to said at least one stabilizer unit to regulate the periodic actuation of the latter for countering said lateral displacement of said platform.

2. In the combination as defined in claim 1 wherein said stablizer unit includes; at least one submerged powered thruster supported on said platform and for providing said reactive force.

3. In the combination as defined in claim 1 wherein said stabilizer unit includes; a plurality of submerged thrusters being spaced apart and supported on said rigid framework.

4. In the combination as defined in claim 1 wherein said stabilizer unit includes; at least one submerged thruster unit, operably carried on said framework and adapted for horizontal adjustment to direct said reactive force.

5. In the combination as defined in claim 1 wherein said rigid framework supporting said platform includes; a plurality of elongated legs extending downwardly from said platform to the ocean floor, and said stabilizer unit including a submerged thruster connected to at least one of said legs at a position intermediate said platform and the floor of said platform desk.

6. In the combination as defined in claim 5 wherein; at least one of said thrusters is operably carried on a platform leg and is rotatable in a substantially horizontal plane about said leg to vary the direction of reactive thrust.

7. In the combination as defined in claim 1 wherein; said stabilizer unit includes a variable speed motor means, and a submerged propeller connected to said motor means to be driven by the later thereby to achieve said directional reactive force.

8. In the combination as defined in claim 1 wherein said stabilizer unit includes; a variable speed motor means having output shaft, a pump connected to said shaft and having suction and discharge openings, said discharge opening being submerged in water and adaptable for directional adjustment in a generally horizontal position to deliver a pressurized water jet for providing said reactive force.

9. In the combination as defined in claim 5 wherein said submerged thruster includes; a pump having a suction inlet connected to a source of water, and having a discharge outlet disposed in a submerged position, at least one motor driven pump being connected to each leg of said offshore structure.

10. In the combination as defined in claim 1 wherein said platform structure includes; at least one elongated leg extending from and connected to said deck, and a ring carried peripherally on said at least one leg at a submerged position thereby forming a track about said leg, and said stabilizer unit includes; a powered thruster adapted to provide said reactive force, said thruster having a chassis supported on said peripheral ring, means for rotatably progressing said chassis along said support ring for varying the direction of said thruster force.

11. In the combination as defined in claim 5 including at least one lateral tension member connected to said thruster and being operable therewith to fixedly positioning the same in a predetermined direction.

12. In the combination as defined in claim 11 wherein said at least one lateral tension member includes a variable length cable connected to opposed sides of said thruster, and means for applying tension to said respective cables.

13. In the combination as defined in claim 11 wherein said monitor means includes; at least one displacement measuring gauge carried on a platform member and being actuatable to provide a signal in response to a strain exhibited by said platform member when subject to wave loads, and an assimilator on said platform deck being in communication with said gauge to register said signal.

14. In the combination as defined in claim 1 wherein said monitor means includes; a plurality of gauges disposed at discrete points about said framework and fixedly carried on said platform members, said gauges being singly operable to provide individual signals therefrom responsive to strain exhibited by a platform member, to which a guage is attached, and an assimilator means on said platform in communication with said respective plurality of gauges to assimilate signal data received therefrom and to program said control means in accordance therewith.

15. In an apparatus as defined in claim 14 including a computer integral with said control means, connected to receive signal data from said plurality of strain gauges, and for regulating operation of said at least one stabilizer unit in anticipation of lateral displacement of said platform.

16. A method of stabilizing an upstanding offshore structure having the lower end anchored in the ocean floor, against periodic lateral displacement about said anchored end induced by waves and other periodically occurring forces acting against the structure, which forces are capable of promoting and amplifying an oscillatory lateral movement of the structure, said structure including a stabilizing system having a plurality of submerged force applying thrust elements connected to the structure upper end and being pivotally rotatable about said structure in a horizontal plane which method includes the steps of;

(a) monitoring the periodic lateral displacement of said upstanding structure, and pivotally rotating said thrust elements into alignment with said periodically occurring forces, and (b) periodically applying an under water force against said structure directionally in opposition to the direction of said periodically occurring forces whereby to counteract said structure displacement, and adjusting said periodically occurring force in response to the magnitude and duration in accordance with the frequency and magnitude of said displacing force.

17. In the method as defined in claim 16 including the steps of;

(a) measuring the strain induced in a plurality of said framework members, (b) assimilating said measured strains, and determining the degree and frequency of said lateral displacement, (c) periodically applying an under water force against said structure directionally in opposition to said periodic lateral force whereby to counteract said displacement, and (d) adjusting said periodically applied force in response to the magnitude of duration thereof in accordance with the frequency and magnitude of said displacing force.

18. In the method as defined in claim 17 including the step of applying a countering force against said structure to a degree in amount proportional to said lateral displaccing frequency.

References Cited
UNITED STATES PATENTS

| | | | |
|---|---|---|---|
| 3,031,997 | 5/1962 | Nesbitt | 61—46.5X |
| 3,294,051 | 12/1966 | Khelstovsky | 61—46.5X |
| 3,327,668 | 6/1967 | Von Schultz | 114—.5 |

JACOB SHAPIRO, Primary Examiner

U.S. Cl. X.R.

61—1; 114—.5